(12) United States Patent
Hatakeyama et al.

(10) Patent No.: US 10,276,144 B2
(45) Date of Patent: Apr. 30, 2019

(54) NOISE REDUCTION DEVICE AND NOISE REDUCTION SYSTEM

(71) Applicant: Panasonic Intellectual Property Management Co., Ltd., Osaka (JP)

(72) Inventors: Takeshi Hatakeyama, Osaka (JP); Tsuyoshi Maeda, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 157 days.

(21) Appl. No.: 15/432,285

(22) Filed: Feb. 14, 2017

(65) Prior Publication Data

US 2018/0075835 A1 Mar. 15, 2018

(30) Foreign Application Priority Data

Sep. 12, 2016 (JP) ................. 2016-177417

(51) Int. Cl.
| | | |
|---|---|---|
| *G10K 11/178* | (2006.01) | |
| *B64C 1/40* | (2006.01) | |
| *B60R 13/08* | (2006.01) | |

(52) U.S. Cl.
CPC ........ *G10K 11/178* (2013.01); *B60R 13/0815* (2013.01); *B64C 1/40* (2013.01); *G10K 11/17857* (2018.01); *G10K 2210/1281* (2013.01); *G10K 2210/3219* (2013.01); *G10K 2210/3221* (2013.01)

(58) Field of Classification Search
CPC .......... G10K 11/178; G10K 11/17857; G10K 2210/1281; G10K 2210/3219; G10K 2210/3221; B60R 13/0815; B64C 1/40
See application file for complete search history.

(56) References Cited

U.S. PATENT DOCUMENTS

| | | | |
|---|---|---|---|
| 5,845,236 A | 12/1998 | Jolly et al. | |
| 2010/0027804 A1 | 2/2010 | Kano | |
| 2010/0111317 A1 | 5/2010 | Asao et al. | |
| 2010/0208911 A1 | 8/2010 | Maeda et al. | |
| 2013/0208906 A1 | 8/2013 | Asao et al. | |

FOREIGN PATENT DOCUMENTS

| | | |
|---|---|---|
| EP | 2 119 627 A1 | 11/2009 |
| JP | 7-160280 A | 6/1995 |
| JP | 10-171468 A | 6/1998 |
| JP | 2009-143392 A | 7/2009 |
| JP | 2010-188752 A | 9/2010 |
| WO | 1998/16916 A1 | 4/1998 |
| WO | 2009/078147 A1 | 6/2009 |

OTHER PUBLICATIONS

Extended Search Report issued in corresponding European Patent Application No. 17156341.4, dated Oct. 17, 2017.

*Primary Examiner* — Regina N Holder
(74) *Attorney, Agent, or Firm* — McDermott Will & Emery LLP

(57) ABSTRACT

A noise reduction device includes: a noise detector that detects noise in a space at least partially surrounded by a shell; a noise controller that generates a control sound signal for reducing the noise detected by the noise detector; and a control sound outputter that outputs control sound to the space based on the generated control sound signal. A seat that is reclinable including a recliner having a seat surface at a variable angle with respect to a reference plane is provided in the space. When L (cm) represents the length of the recliner in the front-to-back direction, the control sound outputter is provided at a height of L×sin θ+8 (cm) above the reference plane where θ is between two degrees and eight degrees, inclusive.

5 Claims, 12 Drawing Sheets

NOISE REDUCTION DEVICE AND NOISE REDUCTION SYSTEM

CROSS REFERENCE TO RELATED APPLICATION

This application claims the benefit of priority of Japanese Patent Application Number 2016-177417 filed on Sep. 12, 2016, the entire content of which is hereby incorporated by reference.

BACKGROUND

1. Technical Field

The present disclosure relates to, for example, a noise reduction device for use inside a hermetically sealed structure such as an aircraft or a railroad vehicle.

2. Description of the Related Art

Regarding a muffling device for electric devices such as an air-conditioning system, Japanese Unexamined Patent Application Publication No. H07-160280 (Patent Literature 1) relates to the positioning of a microphone and a speaker, the length of time taken by noise to propagate, and the control sound to be emitted from the speaker. Patent Literature 1 discloses a method for enhancing the silencing effect on low-frequency components of noise by taking delay time into consideration.

Japanese Unexamined Patent Application Publication No. H10-171468 (Patent Literature 2) discloses a method for enhancing the silencing effect on random noise by taking the positioning of a speaker into consideration with respect to the location at which noise is to be reduced (hereinafter also referred to as "the center of control" or "control point").

SUMMARY

The present disclosure provides a noise reduction device capable of effectively reducing noise.

The noise reduction device according to one aspect of the present disclosure includes: a noise detector that detects noise in a space at least partially surrounded by a shell; a noise controller that generates a control sound signal for reducing the noise detected by the noise detector; and a control sound outputter that outputs control sound to the space based on the control sound signal generated, wherein a seat that is reclinable including a recliner having a seat surface at a variable angle with respect to a reference plane is provided in the space, and when L (cm) represents a length of the recliner in a front-to-back direction, the control sound outputter is provided at a height of $L \times \sin \theta + 8$ (cm) above the reference plane where $\theta$ is between minus four degrees and 12 degrees, inclusive.

The noise reduction device according to one aspect of the present disclosure is capable of effectively reducing noise.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Hereinafter, embodiments will be described in detail with reference to the drawings as necessary. However, there are instances where overly detailed description is omitted. For example, detailed description of well-known matter, overlapping description of substantially identical elements, etc., may be omitted. This is to prevent the subsequent description from becoming unnecessarily redundant, and thus facilitate understanding by a person having ordinary skill in the art.

Note that the accompanying drawings and the subsequent description are provided so that a person having ordinary skill in the art is able to sufficiently understand the present disclosure, and are not intended to limit the scope of the subject matter recited in the claims. The figures are schematic diagrams and are not necessarily precise illustrations. Additionally, elements that are substantially the same share the same reference signs in the figures, and overlapping description thereof may be omitted or simplified.

Embodiment 1

[Noise Environment]

Hereinafter, a noise reduction device according to Embodiment 1 will be described. The following describes an example in which the noise reduction device according to Embodiment 1 is mounted on an aircraft.

Figure 1:
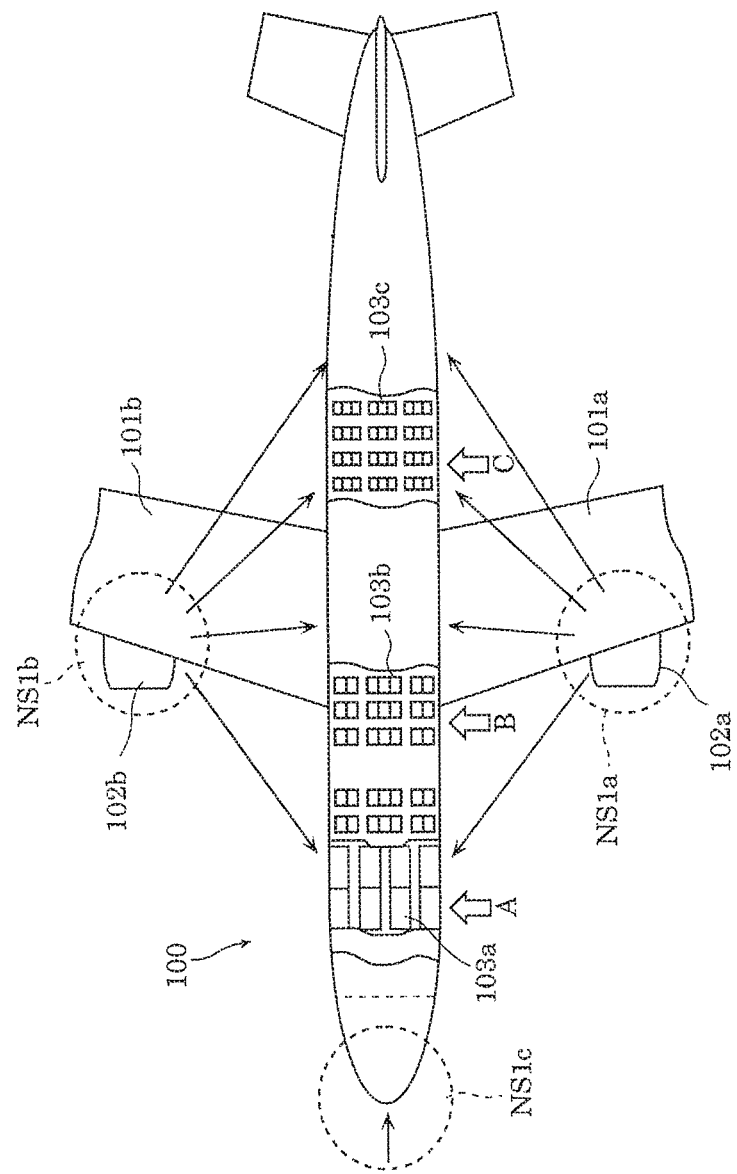
FIG. 1 is a plan view illustrating the environment inside an aircraft in which a noise reduction device according to Embodiment 1 is installed.

First, a noise environment in an aircraft on which the noise reduction device is mounted will be described with reference to FIG. 1 and FIG. 2. FIG. 1 is a plan view illustrating the environment inside an aircraft in which the noise reduction device according to the embodiment is installed;

As illustrated in FIG. 1, aircraft 100 includes left and right wings 101a and 101b and engines 102a and 102b fitted to left and right wings 101a and 101b, respectively. Aircraft 100 is one example of a vehicle.

Considering the space inside aircraft 100 from the viewpoint of a noise environment, sound emitted from engines 102a and 102b accompanies not only revving sound, but also, for example, echoes of the flow of air during flight, and therefore engines 102a and 102b occupy an important place as noise sources.

Engines 102a and 102b function as noise sources NS1a and NS1b, for example, for seat rows 103a, 103b, and 103c placed in cabin A (for example, first class), cabin B (for example, business class), and cabin C (for example, economy class), respectively, inside the aircraft. Sound (wind noise) of the flow of air colliding with the front end of an airframe and left and right wings 101a and 101b, generated when the airframe moves through the air space at high speed, also becomes noise inside aircraft 100, having an adverse effect on an information providing service or the like inside aircraft 100. This means that the front end of the airframe functions as noise source NS1c as well.

Figure 2:
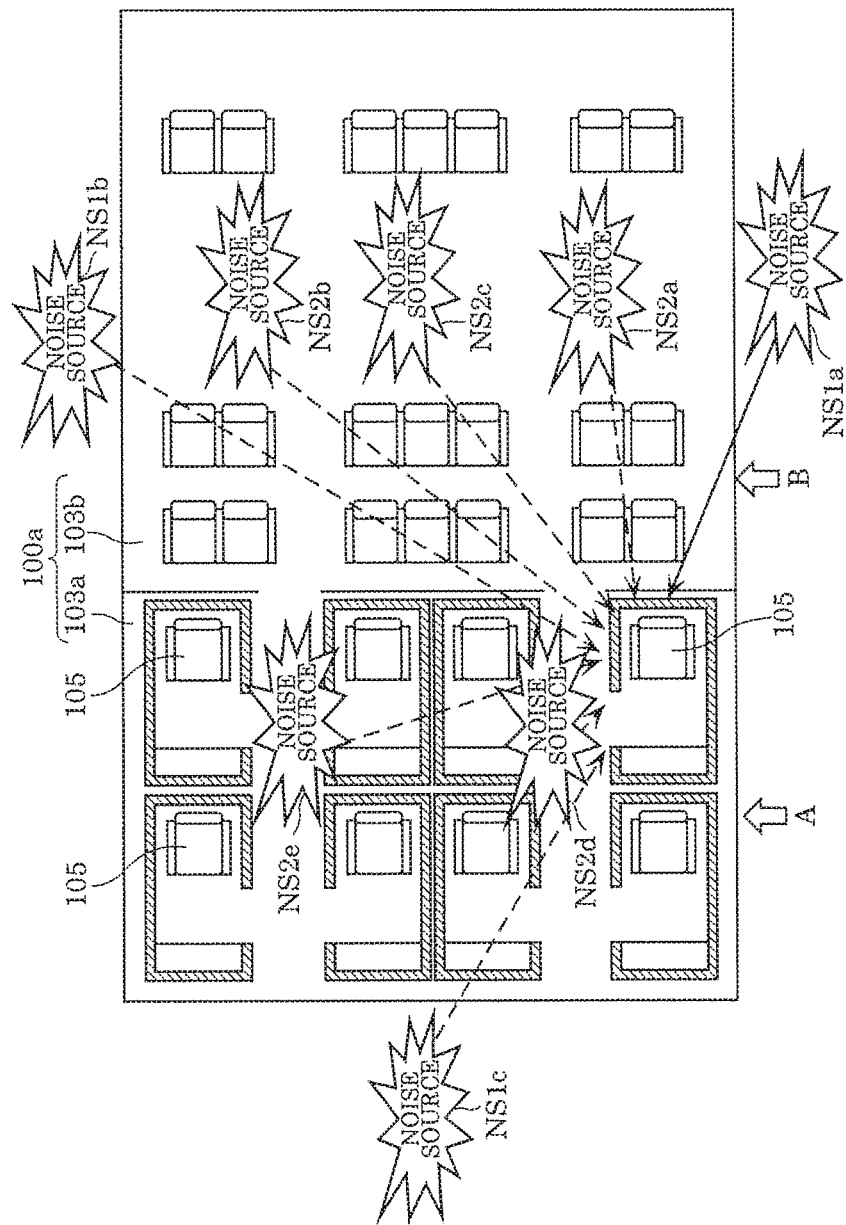
FIG. 2 is a plan view illustrating details of the installation environment of a noise reduction device according to Embodiment 1.

FIG. 2 is a plan view illustrating details of the installation environment of the noise reduction device. In FIG. 2, the positioning of seats in a part of cabin A and cabin B in FIG. 1 is illustrated in enlarged view.

Cabin 100a is divided by walls as cabin A and cabin B, and seat row 103a and seat row 103b are provided in cabin A and cabin B, respectively.

For cabin 100a, noise sources NS1a and NS1b corresponding to engines 102a and 102b and noise source NS1c corresponding to the front end of the airframe which generates wind noise are present as external noise sources for cabin 100a. In addition, noise sources NS2a to NS2e corresponding to air conditioners or the like are present as internal noise sources for cabin 100a.

Noise generated at these noise sources can be considered as noise for one seat 105 placed in cabin A. Specifically, seat 105 is affected by noise from noise sources NS1a and NS1b corresponding to engines 102a and 102b (see FIG. 1) fitted to the wings outside the windows, noise source NS1c corresponding to the front end of the airframe which generates wind noise, and noise sources NS2a to NS2e corresponding to the air conditioners.

In particular, seat 105 is surrounded by a shell structure because cabin A is an area corresponding to first class. Video and audio devices, such as a television and a radio, for providing entertainment such as movies and music, a desk for a business person, a power supply for personal computer (PC) connection, and the like are provided inside the shell structure. Thus, seat 105 is strongly required to provide, to a passenger using seat 105, an environment in which the passenger can relax or can concentrate on business matters. Accordingly, the demand for reduced noise within the shell structure is especially high.

[Basic Configuration of Noise Reduction Device]

Figure 3:
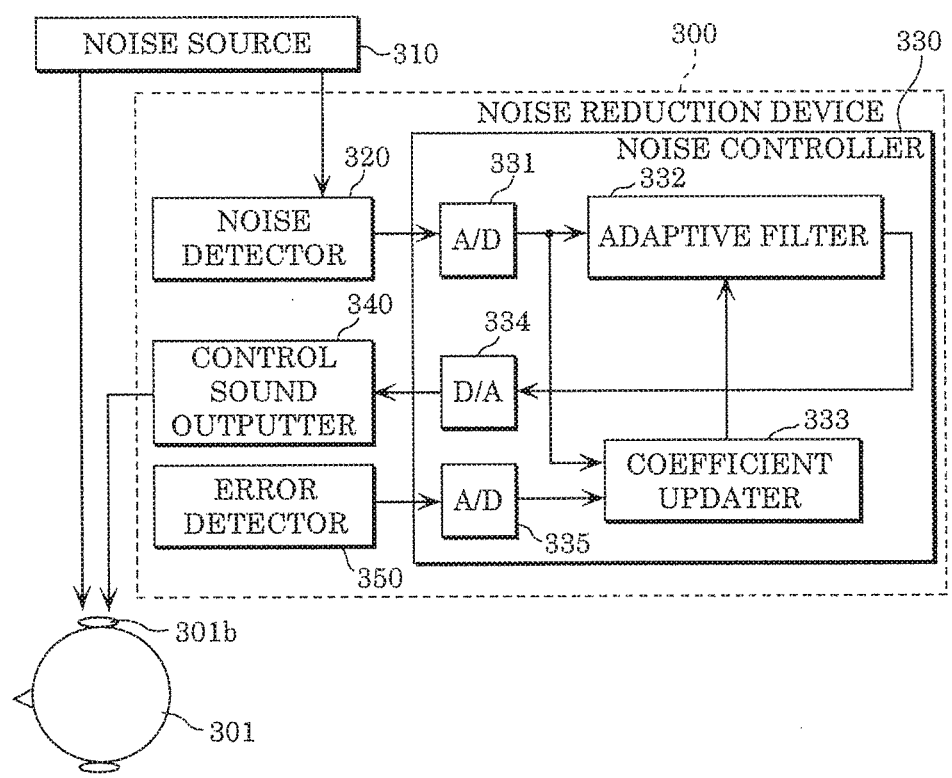
FIG. 3 is a block diagram illustrating the basic configuration of a noise reduction device according to Embodiment 1.

Next, the basic configuration of the noise reduction device according to Embodiment 1 will be described. FIG. 3 is a block diagram illustrating the basic configuration of the noise reduction device according to Embodiment 1.

Noise reduction device 300 illustrated in FIG. 3 is a feedforward noise reduction device. Noise reduction device 300 includes noise detector 320, noise controller 330, control sound outputter 340, and error detector 350. Each of the structural elements will be described below.

Noise detector 320 detects noise emitted from noise source 310. Noise detector 320 is, for example, a microphone, and converts the detected noise into an electric signal and then outputs the electric signal. Noise detector 320 is also referred to as a noise microphone.

Error detector 350 detects residual sound (error sound) that remains as a result of noise emitted from noise source 310 and control sound emitted from control sound outputter 340 being superimposed on each other. Error detector 350 is, for example, a microphone, and converts the error sound into an electric signal and then outputs the electric signal. Error detector 350 is also referred to as an error microphone.

On the basis of noise information from noise detector 320 and error information of error detector 350, noise controller 330 generates a control sound signal so that the detected error is minimized. Noise controller 330 includes A/D converters 331 and 335, adaptive filter 332, coefficient updater 333, and D/A converter 334. Although noise controller 330 is implemented, for example, using a digital signal processor (DSP), noise controller 330 may be implemented using a processor, a microcomputer, an integrated circuit, or the like, other than the DSP.

A/D converter 331 performs A/D conversion for converting, from analog to digital, an electric signal (hereinafter referred to also as a noise signal) output from noise detector 320, and outputs the converted electric signal to adaptive filter 332 and coefficient updater 333. A/D converter 335 performs A/D conversion for converting, from analog to digital, an electric signal (hereinafter referred to also as an error signal) output from error detector 350, and outputs the converted electric signal to coefficient updater 333.

Adaptive filter 332 performs the process of multiplying the A/D converted noise signal with a filter coefficient (a filtering process) and outputs a control sound signal obtained by this process. Specifically, adaptive filter 332 is a finite impulse response (FIR) filter including more than one tap; the filter coefficient for each tap can be freely set.

In addition to the A/D converted noise signal output from A/D converter 331, the A/D converted error signal output from A/D converter 335 is input to coefficient updater 333. Subsequently, coefficient updater 333 adjusts each filter coefficient of adaptive filter 332 so that the input error signal is minimized. As a result of the coefficient adjustment by coefficient updater 333, adaptive filter 332 generates a control sound signal for outputting a control sound opposite in phase to noise from noise source 310 in the position of error detector 350, and outputs the control sound signal to D/A converter 334.

D/A converter 334 performs D/A conversion for converting, from digital to analog, the control sound signal output from adaptive filter 332, and outputs the converted control sound signal to control sound outputter 340.

Control sound outputter 340 converts, into control sound (sound waves), the control sound signal obtained from D/A converter 334, and outputs the control sound. Specifically, control sound outputter 340 is a speaker. The control sound is sound that is opposite in phase to noise and reduces (cancels) noise reaching the vicinity of ear 301b of user 301.

In noise reduction device 300, error detector 350 detects, as an error, residual sound (sound after noise reduction) that remains as a result of noise and control sound being superimposed on each other, and provides a feedback to coefficient updater 333. When error detector 350 is provided in a position in the vicinity of ear 301b of user 301, noise reduction device 300 can reduce noise in a position in the vicinity of ear 301b of user 301 even in the case where the noise environment has changed.

Figure 4:
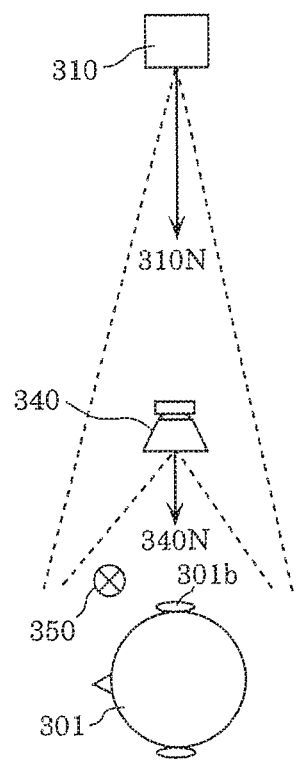
FIG. 4 schematically illustrates one example of the positioning of a control sound outputter and an error detector.

Next, one example of the positioning of control sound outputter 340 and error detector 350 will be described. FIG. 4 schematically illustrates one example of the positioning of control sound outputter 340 and error detector 350.

As illustrated in FIG. 4, control sound outputter 340 is provided in main arrival path 310N of noise connecting noise source 310 and ear 301b of user 301, for example.

When control sound outputter 340 is provided as just described, control sound out of phase with noise by 180 degrees is emitted along main arrival path 340N. This allows noise and control sound to be effectively superimposed on each other before reaching ear 301b of user 301. This means that the noise reduction effect of noise reduction device 300 can be enhanced.

Furthermore, in the example in FIG. 4, error detector 350 is provided within an area in which noise and control sound are superimposed on each other. This allows error detector 350 to effectively detect the residual sound. This means that the noise reduction effect of noise reduction device 300 can be enhanced.

Note that the positioning of control sound outputter 340 and error detector 350 illustrated in FIG. 4 is one example. Even when control sound outputter 340 and error detector 350 are not provided as just described, the effect of reducing noise can be obtained.

[Specific Configuration of Noise Reduction Device]

Figure 5:
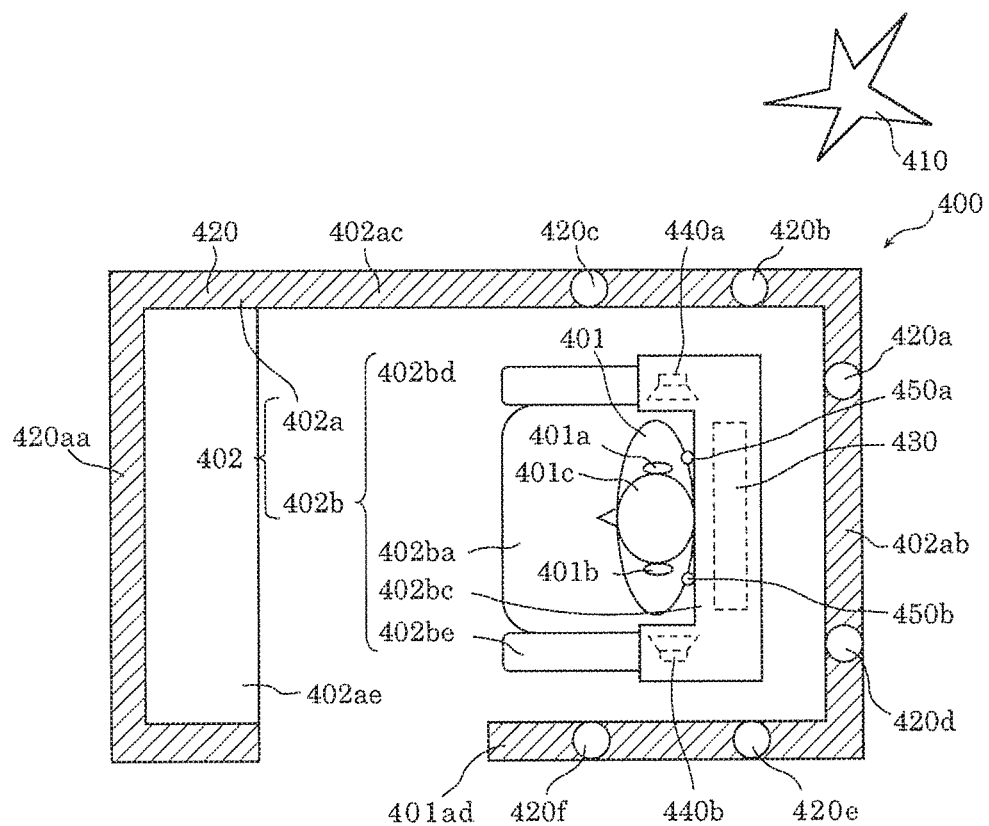
FIG. 5 is a plan view illustrating main elements of a noise reduction device installed in the cabin of an aircraft.

Next, as a more specific configuration of the noise reduction device according to Embodiment 1, an example in which the noise reduction device is installed in cabin A (illustrated in FIG. 1) of aircraft 100 will be described with reference to FIG. 5 to FIG. 7. FIG. 5 is a plan view illustrating main elements of the noise reduction device installed in cabin A of aircraft 100.

Noise reduction device 400 illustrated in FIG. 5 is provided in private cabin 402 located in cabin A of aircraft 100. Private cabin 402 is one example of a space to be controlled in which noise is to be controlled.

Private cabin 402 includes shell 402a and seat 402b. Shell 402a is a separator (a wall) surrounding seat 402b from the lateral direction and defines a space which user 401 occupies inside cabin A. Specifically, shell 402a includes front wall 402aa, back wall 402ab, side wall 402ac, and side wall 402ad. Note that side wall 402ad has an opening for user 401 to enter and exit the space surrounded by shell 402a. Shell 402a has another opening above the head of user 401.

Shell 402a includes shelf 402ae in a position that is forward of seat 402b and surrounded by front wall 402aa, side wall 402ac, and side wall 402ad. Shelf 402ae is used as a desk.

Seat 402b is provided in a space at least partially surrounded by shell 402a. Seat 402b includes a backrest (not illustrated in the drawings), chair seat 402ba on which user 401 sits, headrest 402bc, and armrests 402bd and 402be. Noise controller 430 (corresponding to noise controller 330 illustrated in FIG. 3) is provided inside the backrest of seat 402b.

Noise source 410 for cabin A of aircraft 100 is, for example, engines 102a and 102b mounted on the airframe and an air conditioner provided inside cabin A. Noise emitted from noise source 410 reaches outside private cabin 402.

Shell 402a surrounding seat 402b serves as a physical barrier for private cabin 402 against the noise emitted from noise source 410. Since shell 402a is open above the head of user 401, the noise emitted from noise source 410 enters the inner space of shell 402a from above shell 402a and reaches the vicinity of head 401c of user 401.

Note that when there are various noise sources, as exemplified by the inside of aircraft 100, and the main noise path cannot be identified, more than one omnidirectional noise detector (noise microphone) is provided on or near shell 402a. Specifically, noise reduction device 400 includes noise detectors 420a to 420f provided so as to surround seat 402b. Each of noise detectors 420a to 420f corresponds to noise detector 320 in FIG. 3.

Furthermore, noise reduction device 400 includes control sound outputter 440a and 440b and error detectors 450a and 450b. Control sound outputters 440a and 440b each correspond to control sound outputter 340 in FIG. 3, and error detectors 450a and 450b each correspond to error detector 350 in FIG. 3. In the example in FIG. 5, control sound outputters 440a and 440b and error detectors 450a and 450b are provided on seat 402b.

In noise reduction device 400, the space surrounded by shell 402a (the space in which seat 402b is provided) is a space to be controlled. Each of error detectors 450a and 450b provided near ears 401a and 401b of user 401 sitting in seat 402b is defined as the center of control (a predetermined position that serves as a reference for noise reduction).

Next, the functional configuration of noise reduction device 400 will be described. FIG. 6 is a block diagram simply illustrating the functional configuration of noise reduction device 400 installed in cabin A of aircraft 100. FIG. 7 is a block diagram simply illustrating details of the functional configuration of noise reduction device 400 installed in cabin 100a of aircraft 100.

Figure 6:
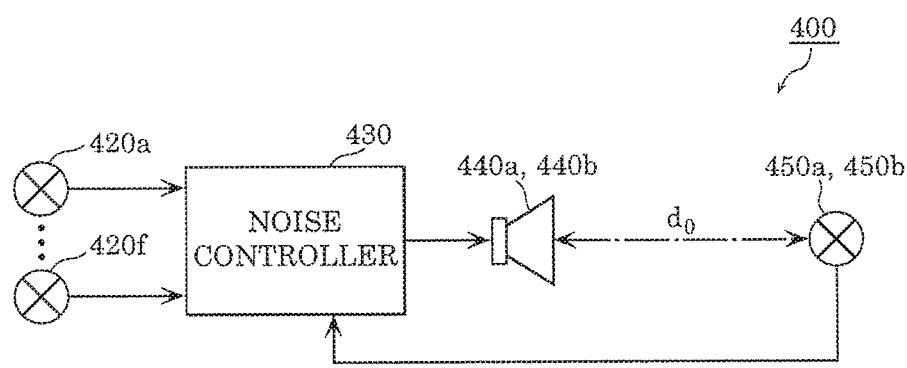
FIG. 6 is a block diagram simply illustrating the functional configuration of a noise reduction device installed in the cabin of an aircraft.
Figure 7:
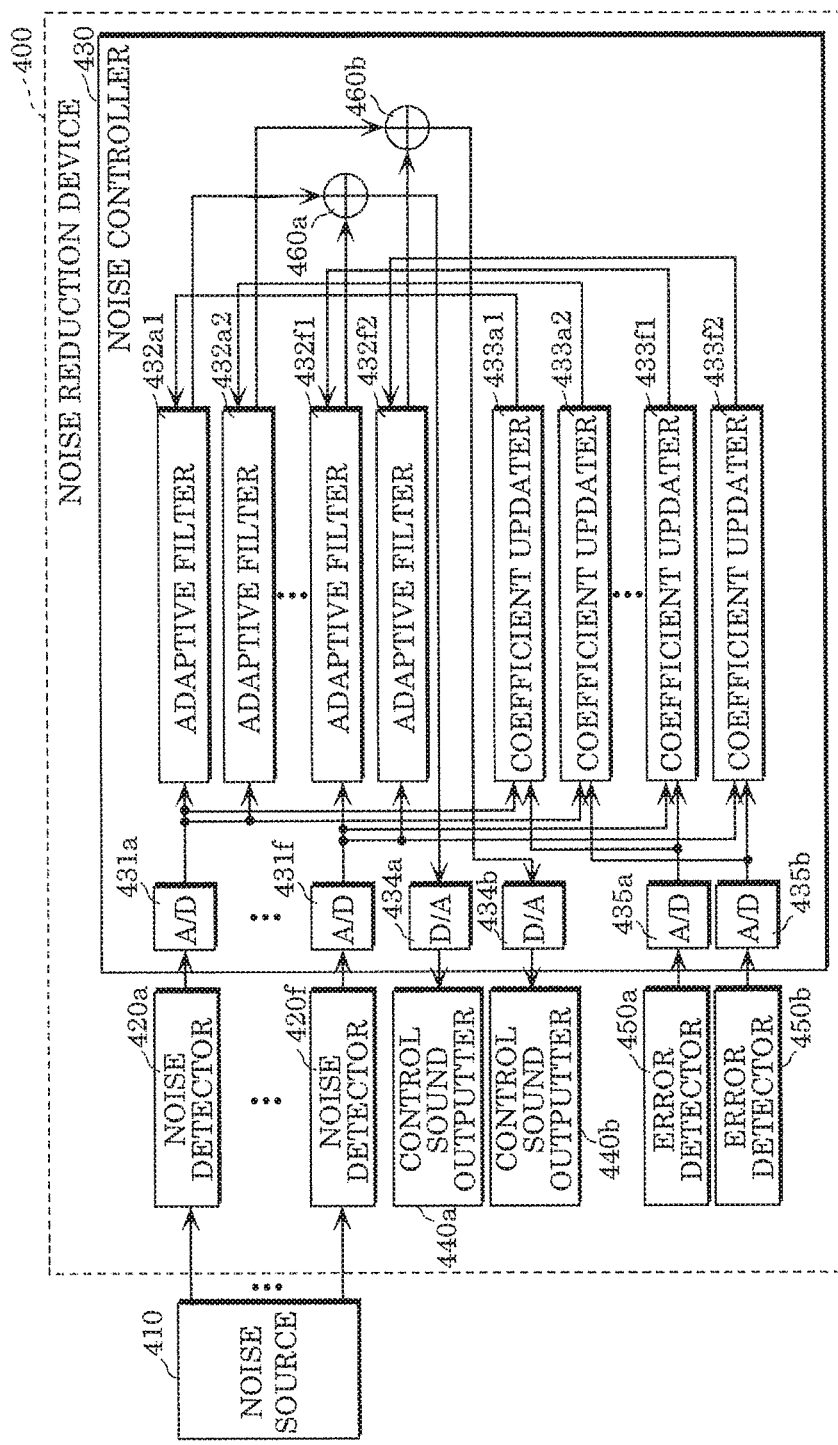
FIG. 7 is a block diagram simply illustrating details of the functional configuration of a noise reduction device installed in the cabin of an aircraft.

As illustrated in FIG. 6, in noise reduction device 400, when noise detectors 420a to 420f detect noise, noise controller 430 causes control sound outputters 440a and 440b to output control sound opposite in phase to the detected noise until the detected noise reaches error detectors 450a and 450b serving as the center of control. In other words, noise reduction device 400 is a feedforward noise reduction device. The distance from error detector 450a (or error detector 450b) to control sound outputter 440a (or control sound outputter 440b) is expressed as d0.

Noise reduction device 400 includes a plurality of noise detectors 420a to 420f, a plurality of control sound outputters 440a and 440b, and a plurality of error detectors 450a and 450b. The functional configuration of noise reduction device 400 is not that simple as illustrated in FIG. 3, but is as illustrated in FIG. 7. Detailed description of structural elements appearing in FIG. 7 with the same names as those in FIG. 3 is omitted, assuming that the structural elements have the same functions.

Noise reduction device 400 uses noise detectors 420a to 420f to detect noise emitted from noise source 410. The noise detected by noise detectors 420a to 420f is converted into digital signals by A/D converters 431a to 431f and then input to adaptive filters 432a1 to 432f2.

Adaptive filters 432a1 to 432f1 correspond one-to-one with noise detectors 420a to 420f and are used to output control sound signals to control sound outputter 440a. Adaptive filters 432a2 to 432f2 correspond one-to-one with noise detectors 420a to 420f and are used to output control sound signals to control sound outputter 440b.

The filter coefficients of adaptive filters 432a1 to 432f1 are adjusted by coefficient updaters 433a1 to 433f1 so that the error detected by error detector 450a is minimized. The filter coefficients of adaptive filters 432a2 to 432f2 are adjusted by coefficient updaters 433a2 to 433f2 so that the error detected by error detector 450b is minimized.

The output from adaptive filters 432a1 to 432f1 is added up by adder 460a and then converted into analog signals and sent to control sound outputter 440a by D/A converter 434a. Accordingly, the control sound is emitted from control sound outputter 440a. The output from adaptive filters 432a2 to 432f2 is added up by adder 460b and then converted into analog signals and sent to control sound outputter 440b by D/A converter 434b. Accordingly, the control sound is emitted from control sound outputter 440b.

Noise-reduced sound detected by error detector 450a is converted into digital signals and sent to coefficient updater 433a1 to 433f1 by A/D converter 435a. Noise-reduced sound detected by error detector 450b is converted into digital signals and sent to coefficient updater 433a2 to 433f2 by A/D converter 435b.

With the configuration described above, noise reduction device 400 is capable of effectively reducing noise in the frequency band from a low frequency range to a high frequency range even when noise comes from various directions due to the presence of many noise sources, as exemplified by the inside of cabin A of aircraft 100. Note that noise reduction device 400 may have a simple configuration such as that of noise reduction device 300.

[Summary of Positioning of Noise Detector]

Next, the positioning of noise detectors 420a to 420f and control sound outputter 440a and 440b will be described.

As illustrated in FIG. 5, noise detectors 420a to 420f included in noise reduction device 400 are attached to shell 402a surrounding seat 402b. Specifically, noise detectors 420a and 420d are attached to back wall 402ab, noise detectors 420b and 420c are attached to side wall 402ac, and noise detectors 420e and 420f are attached to side wall 402ad. In other words, in private cabin 402, six noise detectors 420a to 420f are provided on shell 402a surrounding seat 402b, in order to effectively perform the process of reducing noise that would reach ears 401a and 401b of user 401 sitting in seat 402b.

Figure 8:
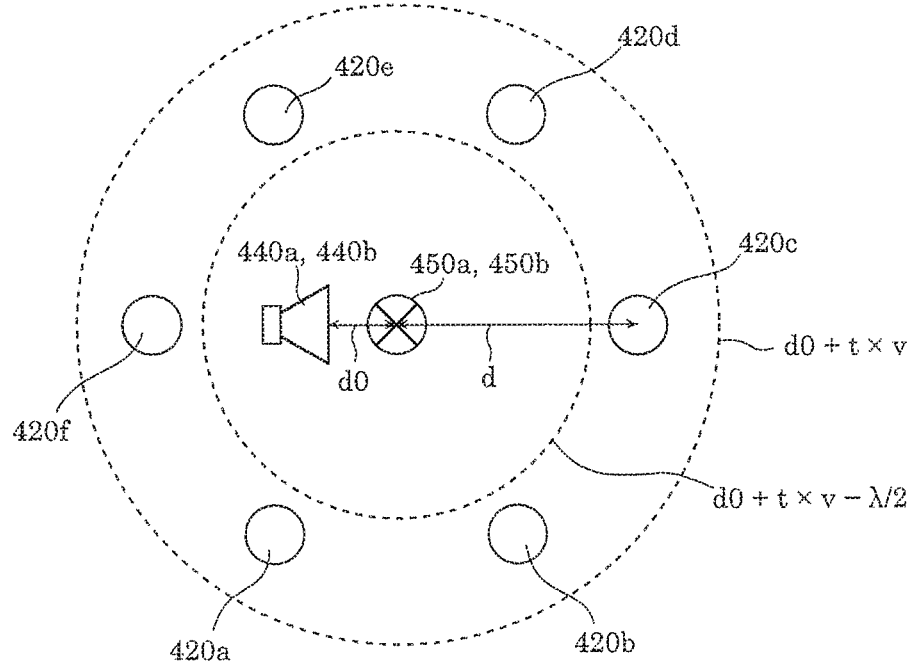
FIG. 8 illustrates the positioning of a noise detector.

The positioning of noise detectors 420a to 420f will be described with reference to FIG. 8. FIG. 8 illustrates the positioning of noise detectors 420a to 420f. FIG. 8 is a plan view of private cabin 402 viewed from above (the head of user 401). The positioning of noise detectors 420a to 420f illustrated in FIG. 8 is schematic and does not entirely match that in FIG. 5.

Feedforward noise reduction device 400 usually needs to output control sound until the detected noise reaches the center of control (the positions of error detectors 450a and 450b). Thus, in control sound outputter 440a (or control sound outputter 440b, which is applied to the following description of FIG. 8), when t represents control delay time, v represents sound velocity, and d0 represents the distance from the center of control to control sound outputter 440a, the positions of noise detectors 420a to 420f need to satisfy relational expression (1) below in order to establish causality. Control delay time t is, for example, the length of time required for control sound outputter 440a to output control sound after obtaining the control sound signal.

$$d \geq d0 + t \times v \tag{1}$$

Japanese Unexamined Patent Application Publication No. 2010-188752 (Patent Literature 3) proposes setting an upper limit frequency for control sound (control sound signals) to make distance d shorter than that in relational expression (1). In Patent Literature 3, specifically, when control sound delay time obtained by adding control delay time and control sound transmittance time taken by control sound to transmit from the control sound outputter to the center of control is larger than noise transmittance time taken by noise to transmit from the noise detector to the center of control, the noise controller generates a control sound signal with one-half of a frequency, one period of which is a difference between the control sound delay time and the noise transmittance time, as an upper limit frequency. In other words, distance d represented according to relational expression (1) can be shortened up to one-half of wavelength λ corresponding to upper limit frequency f. Thus, relational expression (2) below is obtained.

$$d \geq d0 + t \times v - \lambda/2 \tag{2}$$

As described above, noise is arrived at private cabin 402 directly or via reflection from various directions. In such a case, even when a total number of noise detectors is reduced, it is usually possible to obtain correlativity substantially equal to that obtained when the noise detectors are provided in positions away from the center of control, as long as the noise detectors are provided near the center of control. The amount of noise reduction depends on this correlativity.

Therefore, in noise reduction device 400, noise detectors 420a to 420f are provided so that distance d is shorter than that on the right side of relational expression (1) stated above and distance d satisfies relational expression (2). In other words, noise detectors 420a to 420f are provided in positions satisfying relational expression (3) below. Note that in FIG. 8, each of the positions satisfying d=d0+t×v−λ/2 and d=d0+t×v is indicated by a dashed circle.

$$d0 + t \times v - \lambda/2 \leq d \leq d0 + t \times v \tag{3}$$

When noise detectors 420b to 420g are provided in positions satisfying relational expression (3), the number of noise detectors can be reduced, allowing for a reduction in cost for noise reduction device 400 and a reduction in complexity of signal processing. Furthermore, even when the number of noise detectors is reduced, the correlativity stated above does not decline, meaning that the effect of reducing noise can be obtained in a wide frequency band.

[Specific Positioning of Noise Detector]

Figure 9:
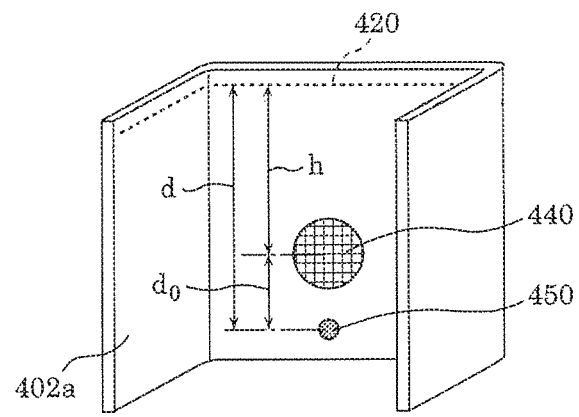
FIG. 9 illustrates the lower limit for the distance from the position of a control sound outputter to the position of a noise detector in a noise reduction device according to Embodiment 1.

Next, specific positioning of the noise detector in noise reduction device 400 will be described. The following describes the upper limit and the lower limit for distance h from the position of the control sound outputter to the position of the noise detector in noise reduction device 400. First, the lower limit will be described. FIG. 9 illustrates the lower limit for distance h from the position of the control sound outputter to the position of the noise detector in noise reduction device 400. Hereinafter, description will be given of the positioning of noise detector 420 which is one of noise detectors 420a to 420f, control sound outputter 440 which is one of control sound outputters 440a and 440b, and error detector 450 which is one of error detectors 450a and 450b.

As described above, shell 402a is open above the head of user 401, and noise comes from above shell 402a. Noise detector 420 needs to obtain noise as early as possible and therefore, desirably is provided on an upper portion of shell 402a. The position (height) of noise detector 420 is schematically indicated by a dashed line in FIG. 9.

As illustrated in FIG. 9, the lower limit for distance h from the position of control sound outputter 440 to the position of noise detector 420 is defined on the basis of the case (h=d−d0) in which the position of error detector 450 is farther away from the position of noise detector 420 than the position of control sound outputter 440 is.

At this time, distance d from the position of noise detector 420 to the position of error detector 450 needs to satisfy d≥d0+t×−λ/2 according to the inequality on the left side of relational expression (3) stated above. Thus, distance h needs to satisfy relational expression (4) below.

$$h \geq t \times v - \lambda/2 \quad (4)$$

Figure 10:
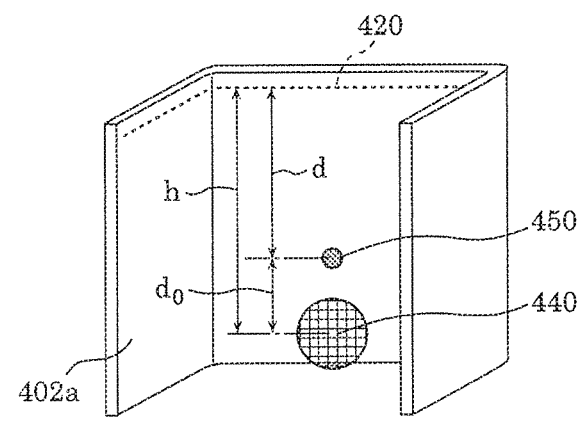
FIG. 10 illustrates the upper limit for the distance from the position of a control sound outputter to the position of a noise detector in a noise reduction device according to Embodiment 1.

Next, the upper limit for distance h will be described. FIG. 10 illustrates the upper limit for distance h from the position of control sound outputter 440 to the position of noise detector 420 in noise reduction device 400.

As illustrated in FIG. 10, the upper limit for distance h from the position of control sound outputter 440 to the position of noise detector 420 is defined on the basis of the case (h=d+d0) in which the position of error detector 450 is closer to the position of noise detector 420 than the position of control sound outputter 440 is.

The distance from the position of noise detector 420 to the position of error detector 450 needs to satisfy d≤d0+t×v on the basis of the inequality on the right side of relational expression (3). Thus, distance h needs to satisfy relational expression (5) below.

$$h \leq 2d0 + t \times v \quad (5)$$

[Specific Example of Distance h]

A specific example of distance h will be described using relational expressions (4) and (5) stated above. The values of control delay time t and sound velocity v in control sound outputter 440 are, for example, as follows.

t: 2 ms v: 340 m/s

Distance d0 from the position of error detector 450 (the center of control) to the position of control sound outputter 440 is determined so as to match, for example, the distance from the position of control sound outputter 440 to the position of a tragus of user 401. Consequently, the sound pressure around error detector 450 and the sound pressure around the tragus are matched, producing the effect of the noise level in the position of the tragus approaching the noise level in the position of error detector 450.

Figure 11:
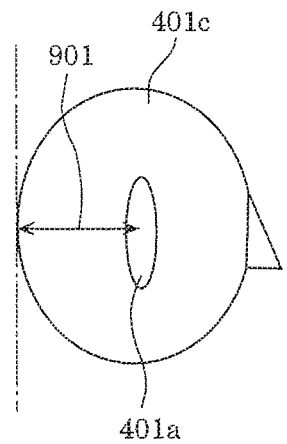
FIG. 11 illustrates an occiput-tragus distance.

According to the advanced industrial science and technology (AIST) anthropometric database 1991 to 1992, occiput-tragus distance 901 of 5% to 95% of the adult males and females is between 77 mm and 99 mm, inclusive, as illustrated in FIG. 11. Thus, distance d0 is defined as 10 cm (=100 mm), for example. FIG. 11 illustrates occiput-tragus distance 901. According to the above description, relational expressions (4) and (5) are deformed as follows.

$$h \geq 68 \text{ cm} - \lambda/2 \quad (6)$$

$$h \leq 88 \text{ cm} \quad (7)$$

When upper limit frequency f of control sound for obtaining the noise reduction effect is 1 kHz, wavelength λ>34 cm holds, and applying this to relational expressions (6) and (7) results in 51 cm≤h≤88 cm.

Summary of Embodiment 1

As described above, noise reduction device 400 includes: noise detector 420 that is provided on an upper portion of shell 402a and detects noise in a predetermined position within a space at least partially surrounded by shell 402a; noise controller 430 that generates a control sound signal for reducing the noise detected by noise detector 420; and control sound outputter 440 that outputs control sound to the space based on the generated control sound signal. The predetermined position is, for example, the center of control (the position of error detector 450). When λ represents the wavelength corresponding to upper limit frequency f of the control sound, d0 represents the distance from the predetermined position to the position of control sound outputter 440, t represents the control delay time of control sound outputter 440, and v represents the sound velocity, distance h from the position of noise detector 420 to the position of control sound outputter 440 satisfies t×v−λ/2≤h≤2d0+t×v. More specifically, distance h is between 51 cm and 88 cm, inclusive.

With this, noise reduction device 400 is capable of effectively reducing noise by optimizing the positions of control sound outputter 440 and noise detector 420 in private cabin 402 including shell 402a.

Embodiment 2

[Positioning of Control Sound Outputter for Reclinable Seat]

Embodiment 2 describes the positioning of control sound outputter 440 when a reclinable seat is provided within the space surrounded by shell 402a. In Embodiment 2 below, matters already described in Embodiment 1 (for example, the description of the block diagram of noise reduction device 400) will be omitted.

Figure 12:
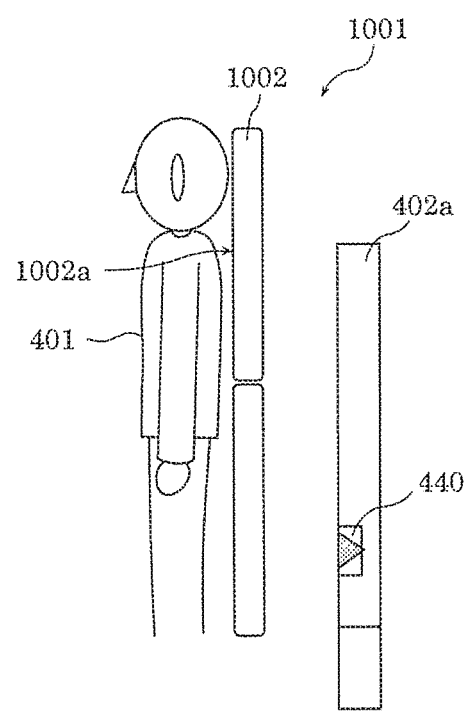
FIG. 12 illustrates a reclinable seat in an upright state.
Figure 13:
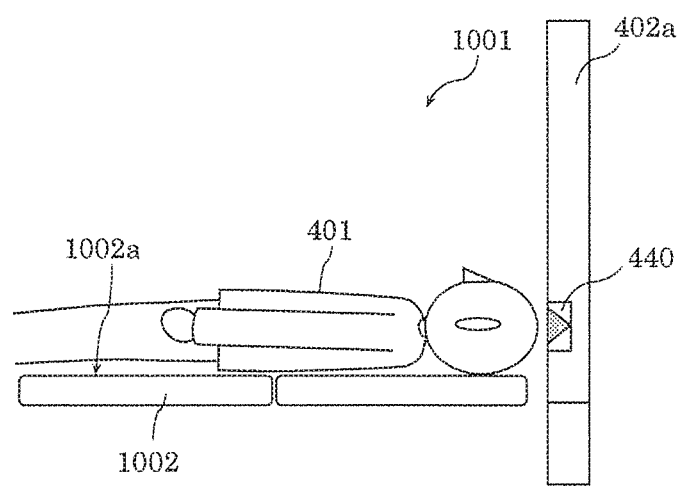
FIG. 13 illustrates a reclinable seat in a full-flat state.

The reclinable seat to be described in Embodiment 2 can be changed between an upright state and a full-flat state by changing the seat angle. FIG. 12 illustrates reclinable seat 1001 in the upright state. FIG. 13 illustrates reclinable seat 1001 in the full-flat state. A portion of reclinable seat 1001, the angle of which is changed with respect to a reference plane, is referred to as recliner 1002. Recliner 1002 includes seat surface 1002a. Seat surface 1002a has, for example, a roughly rectangular shape in plan view. The reference plane means a plane that matches seat surface 1002a in the full-flat state (when seat surface 1002a is orthogonal to shell 402a).

Figure 14:
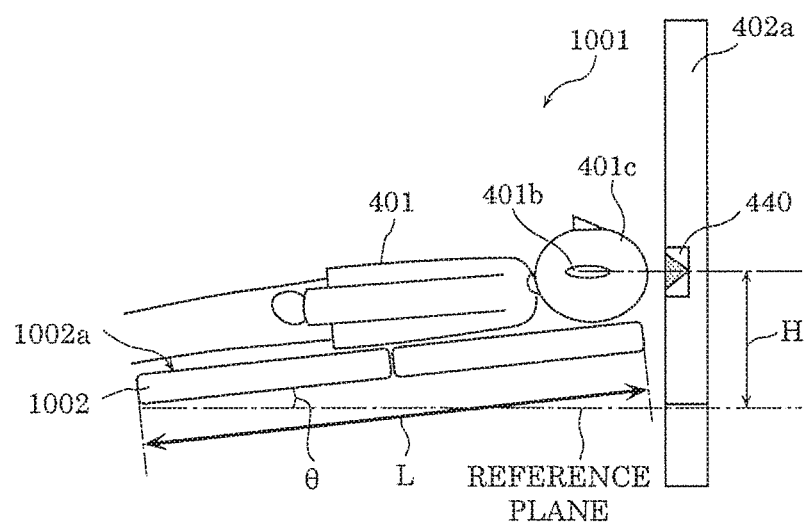
FIG. 14 illustrates the positioning of a control sound outputter according to Embodiment 2.

In such reclinable seat 1001, control sound outputter 440 is provided as illustrated in FIG. 14. FIG. 14 illustrates the positioning of control sound outputter 440 according to Embodiment 2.

Reclinable seat 1001 allows user 401 to sleep thereon. Reclinable seat 1001 is used nearly in the full-flat state during bedtime. As illustrated in FIG. 14, user 401 often sleeps not in the full-flat state, but with recliner 1002 inclined at about angle θ (2 degrees≤θ≤8 degrees) so that the head 401c-end of recliner 1002 is at an elevated level. Thus, in Embodiment 2, control sound outputter 440 is provided in consideration of angle θ.

The height of ear 401b of user 401 lying on recliner 1002 (seat surface 1002a) is substantially constant during sleep. Accordingly, when control sound outputter 440 and ear 401b are at the same height, the control sound can produce a sufficient noise reduction effect.

The distance from the position of error detector 450 (the center of control) to the position of control sound outputter 440 is determined so as to match, for example, the distance from the position of control sound outputter 440 to the position of ear 401b of user 401. Consequently, the sound pressure around error detector 450 and the sound pressure around ear 401b are matched, producing the effect of the noise level in the position of ear 401b approaching the noise level in the position of error detector 450.

Furthermore, when control sound outputter 440 and ear 401b (the tragus) are at the same height, the distance between control sound outputter 440 and the tragus and the distance between control sound outputter 440a and error detector 450 can be easily matched. This is because usually the height of the ears of user 401 lying on recliner 1002 (seat surface 1002a) is substantially constant during sleep, and thus it is easy to position error detector 450 so that the distance between control sound outputter 440 and the tragus and the distance between control sound outputter 440a and error detector 450 are matched. In other words, when control sound outputter 440 and ear 401b are at the same height, the noise level at ear 401b and the noise level at error detector 450 can easily approach each other.

The following describes a mathematical expression for positioning control sound outputter 440 at the same height as ear 401b in consideration of angle θ. According to the AIST anthropometric database 1991 to 1992, occiput-tragus distance 901 of 5% to 95% of the adult males and females is between 77 mm and 99 mm, inclusive, as illustrated in FIG. 11. Thus, the distance from seat surface 1002a to the tragus is set to 8 cm (80 mm) as an average value.

The difference in height from the reference plane is L×sin θ where L (cm) represents the length of recliner 1002 in the front-to-back direction thereof (the direction from head 401ac to the toes of user 401 lying thereon, that is, the direction of travel of the aircraft). The front-to-back direction of recliner 1002 is, in other words, the longitudinal direction of recliner 1002.

According to the above description, control sound outputter 440 is provided in a position such that height H from the reference plane is L×sin θ+8 (cm) where 2 (degree)≤θ≤8 (degree).

Note that although control sound outputter 440 is attached to shell 402a, in a position close to head 401c of user 401, it is sufficient that control sound outputter 440 be provided in a position such that the height thereof from the reference plane is L×sin θ+8 (cm). For example, control sound outputter 440 may be attached to shell 402a, in a position close to the toes of user 401, or may be attached to a member other than shell 402a.

Summary of Embodiment 2

As described above, in Embodiment 2, noise reduction device 400 includes: noise detector 420 that detects noise in a space at least partially surrounded by shell 402a; noise controller 430 that generates a control sound signal for reducing the noise detected by noise detector 420; and control sound outputter 440 that outputs control sound to the space based on the generated control sound signal. Reclinable seat 1001 including recliner 1002 having seat surface 1002a at a variable angle with respect to the reference plane is provided in the space. When L (cm) represents the length of recliner 1002 in the front-to-back direction, control sound outputter 440 is provided at a height of L×sin θ+8 (cm) above the reference plane where 2 (degree)≤θ≤8 (degree).

As a result of control sound outputter 440 being provided at the height determined according to this expression, noise reduction device 400 is capable of effectively reducing noise.

Embodiment 3

[Positioning of Control Sound Outputter in Reclinable Seat]

Embodiment 3 describes another example of the positioning of control sound outputter 440 when the reclinable seat is provided within the space surrounded by shell 402a. In Embodiment 3 below, matters already described in Embodiments 1 and 2 will be omitted.

Figure 15:
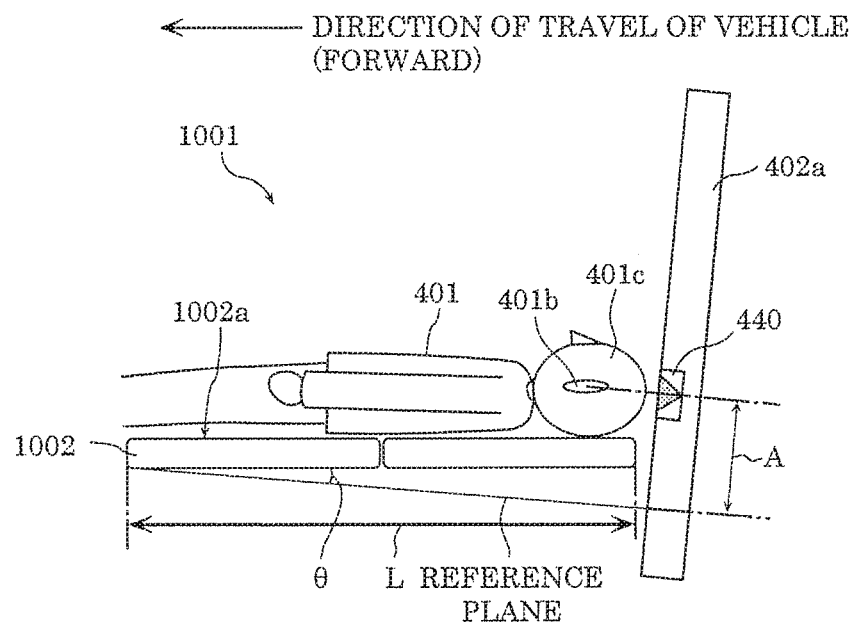
FIG. 15 illustrates an inclination of a recliner facing forward during the flight of an aircraft.
Figure 16:
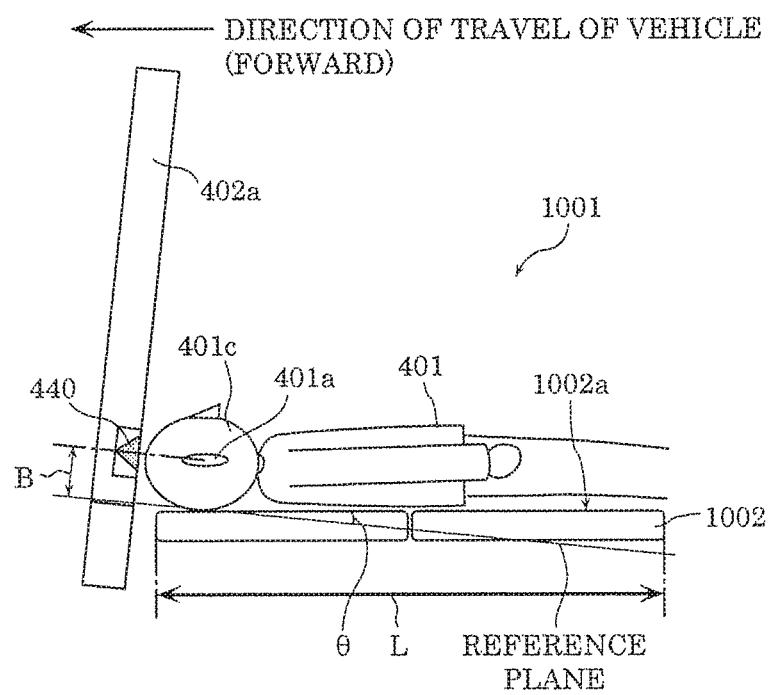
FIG. 16 illustrates an inclination of a recliner facing backward during the flight of an aircraft.

In actual aircraft 100, recliner 1002 is generally inclined at an angle between about one degree and four degrees, inclusive, with respect to the direction of travel during level flight in order to improve the fuel economy. FIG. 15 and FIG. 16 each illustrate an inclination of recliner 1002 during the flight of aircraft 100.

In FIG. 15, seat 1001 is provided so that a user sitting in seat 1001 faces in the direction of travel of aircraft 100. Thus, seat 1001 is provided to face in the direction of travel (face forward). In this case, recliner 1002 is inclined at an angle between about one degree and four degrees, inclusive, during the flight of aircraft 100 so that recliner 1002 is elevated on the user 401's head 401c-side.

In FIG. 16, seat 1001 is provided so that a user sitting in seat 1001 faces in the direction opposite to the direction of travel of aircraft 100. Thus, seat 1001 is provided to face in the direction opposite to the direction of travel (face backward). In this case, recliner 1002 is inclined at an angle between about one degree and four degrees, inclusive, during the flight of aircraft 100 so that recliner 1002 hangs down on the user 401's head 401c-side.

In consideration of those just described, in order for control sound outputter 440 to be provided at the same height as ear 401b (or ear 401a) as in Embodiment 2, the height of control sound outputter 440 above the reference plane is represented according to the following expression in Embodiment 3.

First, in seat 1001 provided to face forward in FIG. 15, height A of control sound outputter 440 above the reference plane is as follows: A=L×sin θ+8 (cm) where 1 (degree) ≤θ≤4 (degree).

In seat 1001 provided to face backward in FIG. 16, height B of control sound outputter 440 above the reference plane is as follows: B=L×sin θ+8 (cm) where −4 (degree)≤θ≤−1 (degree).

As a result of control sound outputter 440 being provided at the height determined according to such an expression, noise reduction device 400 is capable of effectively reducing noise.

Furthermore, as described in Embodiment 2, user 401 may place recliner 1002 in the state of being elevated at an angle between about two degrees and eight degrees, inclusive, instead of the full-flat state (zero degree). Thus, the height of control sound outputter 440 above the reference plane in order for control sound outputter 440 to be provided at the same height as ear 401b (or ear 401a) is represented according to the following expression.

First, in seat 1001 provided to face forward in FIG. 15, height A of control sound outputter 440 above the reference plane is as follows: A=L×sin θ+8 (cm) where 3 (degree) ≤θ≤12 (degree).

In seat 1001 provided to face backward in FIG. 16, height B of control sound outputter 440 above the reference plane is as follows: B=L×sin θ+8 (cm) where −2 (degree)≤θ≤7 (degree).

As a result of control sound outputter 440 being provided at the height determined according to such an expression, noise reduction device 400 is capable of effectively reducing noise. To sum up Embodiment 2 and Embodiment 3, θ only needs to satisfy −4 (degree)≤θ≤12 (degree).

[Noise Reduction System]

Next, a noise reduction system according to Embodiment 3 will be described. This noise reduction system is applied in the case in which there are both seat 1001 provided to face forward and seat 1001 provided to face backward inside single aircraft 100.

The noise reduction system includes: a first noise reduction device that reduces noise in a first space at least partially surrounded by a first shell provided inside aircraft 100; and a second noise reduction device that reduces noise in a second space at least partially surrounded by a second shell provided inside the aircraft.

The first noise reduction device includes: a first noise detector that detects noise in the first space; a first noise controller that generates a first control sound signal for reducing the noise detected by the first noise detector; and a first control sound outputter that outputs control sound to the first space based on the generated first control sound signal. The functional configuration of the first noise reduction device is the same as that of noise reduction device 300 or noise reduction device 400.

The second noise reduction device includes: a second noise detector that detects noise in the second space; a second noise controller that generates a second control sound signal for reducing the noise detected by the second noise detector; and a second control sound outputter that outputs control sound to the second space based on the generated second control sound signal. The functional configuration of the second noise reduction device is the same as that of noise reduction device 300 or noise reduction device 400.

A first seat that is reclinable including a recliner having a first seat surface at a variable angle with respect to a first reference plane is provided in the first space to make a user sitting in the first seat face in a direction of travel of aircraft 100. Specifically, the first seat is positioned as illustrated in FIG. 15.

A second seat that is reclinable including a recliner having a second seat surface at a variable angle with respect to a second reference plane is provided in the second space to make a user sitting in the second seat face in a direction opposite to the direction of travel of aircraft 100. Specifically, the second seat is positioned as illustrated in FIG. 16.

In this case, the first control sound outputter is provided at height A above the first reference plane, and the second control sound outputter is provided at height B above the second reference plane where A>B.

In such a noise reduction system, the height of control sound outputter 440 is different depending on the orientation of the seat, and thus it is possible to effectively reduce noise.

Embodiment 4

[Positioning of Control Sound Outputter in Seat on which User is Obliquely Lying on his or her Back]

Figure 17:
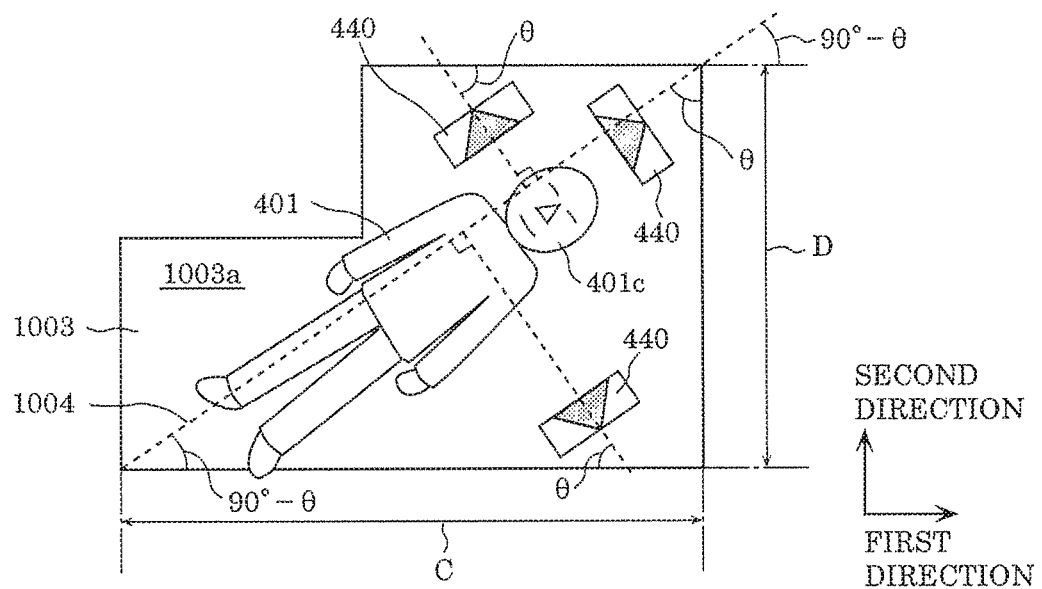
FIG. 17 is a plan view of a seat on which a user is obliquely lying on his or her back.

Embodiment 4 describes the positioning of control sound outputter 440 when a seat on which user 401 is obliquely lying on his or her back is provided within the space surrounded by shell 402a. In Embodiment 4 below, matters already described in Embodiments 1 to 3 will be omitted. FIG. 17 is a plan view of a seat on which user 401 is obliquely lying on his or her back.

As illustrated in FIG. 17, seat surface 1003a of seat 1003 according to Embodiment 4 is in the form of a rectangle with one corner cut in a rectangular shape in plan view. The longer-side direction of seat surface 1003a is defined as a first direction, and C represents the length of seat surface 1003 in the first direction. The shorter-side direction of seat surface 1300a is defined as a second direction, and D represents the length of seat surface 1003a in the second direction. Note that seat surface 1003a may be in the form of a simple rectangle in plan view.

Seat 1003 is designed with the assumption that user 401 will obliquely lie on his or her back. Obliquely lying herein means lying in a direction that is neither parallel nor perpendicular to the longer-side direction of seat surface 1003a, but is, for example, along diagonal 1004 of seat surface 1003a.

In such seat 1003, control sound outputter 440 outputs control sound toward head 401c of user 401 lying on his or her back, to maximize the sound pressure level of control sound at the center of control, and thus the noise reduction effect can be enhanced.

For example, in order for control sound outputter 440 to output control sound toward user 401 from a position right beside head 401c of user 401 lying on his or her back on seat surface 1003a, it is sufficient that control sound outputter 440 be provided so that the angle between the first direction and an axis of sound output (a direction of sound output) of control sound outputter 440 becomes θ (degree) where θ=90−arctan (C/D). In order for control sound outputter 440 to output control sound toward user 401 from a position laterally near user 401, it is sufficient that the angle between the first direction and the axis of sound output (the direction of sound output) of control sound outputter 440 be θ±10 (degree). Thus, θ only needs to satisfy 80−arctan (C/D) ≤θ≤100−arctan (C/D).

In order for control sound outputter 440 to output control sound toward user 401 from a position above the head of user 401 lying on his or her back on seat surface 1003a, it is sufficient that control sound outputter 440 be provided so that the angle between the first direction and the axis of sound output (the direction of sound output) of control sound outputter 440 be 90−θ (degree) where 80−arctan (C/D)≤θ≤100−arctan (C/D).

Summary of Embodiment 4

As described above, in Embodiment 4, noise reduction device 400 includes: noise detector 420 that detects noise in a space at least partially surrounded by shell 402a; noise controller 430 that generates a control sound signal for reducing the noise detected by noise detector 420; and control sound outputter 440 that outputs control sound to the space based on the generated control sound signal. Seat 1003 having seat surface 1003a is provided in the space. When C represents the length of seat surface 1003a in the first direction and D represents the length of seat surface 1003a in the second direction orthogonal to the first direction in plan view, control sound outputter 440 is provided so that the angle between the first direction and the axis of sound output of the control sound outputter is 0 (degree) or 90−θ (degree) where 80−arctan (C/D)≤θ≤100−arctan (C/D).

As a result of control sound outputter 440 being provided in the attitude determined according to such an expression, noise reduction device 400 is capable of effectively reducing noise.

Other Embodiments

The embodiments have each been described above by way of example of techniques disclosed in the present application. The techniques according to the present disclosure, however, are not limited to the foregoing embodiments, and can also be applied to embodiments obtained by carrying out modification, substitution, addition, omission, etc., as necessary. Furthermore, a new embodiment can be formed by combining the respective structural elements described in the foregoing embodiments.

For example, members described in the foregoing embodiments as those to which the noise detector, the control sound outputter, and the error detector are attached are mere examples. The noise detector, the control sound outputter, and the error detector may be attached to any member as long as the positional relationship described in the foregoing embodiments holds.

Furthermore, although the foregoing embodiments have described an example in which the noise reduction device and the noise reduction system are provided in an aircraft, the noise reduction device and the noise reduction system may be installed in a vehicle other than the aircraft such as a road or railroad vehicle.

All or a part of the structural elements such as the noise controller in each of the foregoing embodiments may be configured in the form of an exclusive hardware product, or may be realized by executing a software program suitable for each of structural elements. Each of the structural elements may be realized by means of a program executing unit, such as a central processing unit (CPU) and a processor, reading and executing the software program recorded on a recording medium such as a hard disk or a semiconductor memory.

As described above, the embodiments have been described as exemplifications of the technique according to the present disclosure. As such, the accompanying drawings and detailed description are provided for this purpose. Therefore, the structural elements described in the accompanying drawings and detailed description may include, not only structural elements essential to solving the problem, but also structural elements that are not essential to solving the problem but are included in order to exemplify the aforementioned technique. As such, description of these non-essential structural elements in the accompanying drawings and the detailed description should not be taken to mean that these non-essential structural elements are essential.

Furthermore, since the foregoing embodiments are for exemplifying the technique according to the present disclosure, various changes, substitutions, additions, omissions, etc., can be carried out within the scope of the claims or its equivalents.

INDUSTRIAL APPLICABILITY

The noise reduction device according to the present disclosure is capable of effectively reducing noise and is applicable to a vehicle such as an aircraft.

What is claimed is:

1. A noise reduction device, comprising:
a noise detector that detects noise in a space at least partially surrounded by a shell;
a noise controller that generates a control sound signal for reducing the noise detected by the noise detector; and
a control sound outputter that outputs control sound to the space based on the control sound signal generated,
wherein a seat that is reclinable including a recliner having a seat surface at a variable angle with respect to a reference plane is provided in the space, and
when L (cm) represents a length of the recliner in a front-to-back direction, the control sound outputter is provided at a height of L×sin θ+8 (cm) above the reference plane where θ is between minus four degrees and minus one degrees, inclusive.

2. The noise reduction device according to claim 1, wherein the shell is provided inside a vehicle, and
the seat is provided to make a user sitting in the seat face in a direction opposite to a direction of travel of the vehicle.

3. The noise reduction device according to claim 2, wherein the vehicle is an aircraft.

4. A noise reduction system, comprising:
a first noise reduction device that reduces noise in a first space at least partially surrounded by a first shell provided inside a vehicle; and
a second noise reduction device that reduces noise in a second space at least partially surrounded by a second shell, the second shell being distinct and separate from the first shell, and the second shell being provided inside the vehicle,
wherein the first noise reduction device includes:
a first noise detector that detects noise in the first space;
a first noise controller that generates a first control sound signal for reducing the noise detected by the first noise detector; and
a first control sound outputter that outputs control sound to the first space based on the first control sound signal generated,
the second noise reduction device includes:
a second noise detector that detects noise in the second space;
a second noise controller that generates a second control sound signal for reducing the noise detected by the second noise detector; and
a second control sound outputter that outputs control sound to the second space based on the second control sound signal generated,
a first seat that is reclinable including a recliner having a first seat surface at a variable angle with respect to a first reference plane is provided in the first space to make a user sitting in the first seat face in a direction of travel of the vehicle,
a second seat that is reclinable including a recliner having a second seat surface at a variable angle with respect to a second reference plane is provided in the second space to make a user sitting in the second seat face in a direction opposite to the direction of travel of the vehicle,
the first control sound outputter is provided at height A above the first reference plane,
the second control sound outputter is provided at height B above the second reference plane, and
A is greater than B.

5. The noise reduction system according to claim 4, wherein the vehicle is an aircraft.

* * * * *